United States Patent [19]
Kischkewitz et al.

[11] Patent Number: 5,837,635
[45] Date of Patent: Nov. 17, 1998

[54] PROCESS FOR PRODUCING MIXED OXIDE POWDERS FROM DEACTIVATED DENOX CATALYSTS

[75] Inventors: Jürgen Kischkewitz, Ratingen; Günter Linde, Krefeld; Hans-Joachim Schittenhelm, Köln; Günter Lailach, Krefeld; Kai Bütje, Duisburg, all of Germany

[73] Assignee: Bayer AG, Leverkusen, Germany

[21] Appl. No.: 840,790

[22] Filed: Apr. 16, 1997

[30] Foreign Application Priority Data

Apr. 29, 1996 [DE] Germany ............... 196 17 081.8

[51] Int. Cl.$^6$ .................................... B01J 20/34
[52] U.S. Cl. ................... 502/24; 502/22; 502/27
[58] Field of Search ............... 502/22, 24, 27, 502/56

[56] References Cited

U.S. PATENT DOCUMENTS

| | | | |
|---|---|---|---|
| 4,615,991 | 10/1986 | Obayashi et al. | 502/28 |
| 4,656,147 | 4/1987 | Iida et al. | 502/26 |
| 4,925,640 | 5/1990 | Morii et al. | 423/239 |
| 5,087,430 | 2/1992 | Hanada et al. | 423/239 |
| 5,120,690 | 6/1992 | Jung et al. | 501/155 |
| 5,324,695 | 6/1994 | Karrer et al. | 502/27 |

FOREIGN PATENT DOCUMENTS

| | | |
|---|---|---|
| 499351 | 8/1992 | European Pat. Off. |
| 2127348 | 12/1971 | Germany |
| 3903590 | 8/1980 | Germany |
| 3816600 | 11/1989 | Germany |
| 3824464 | 1/1990 | Germany |
| 4242978 | 12/1992 | Germany |
| 4319733 | 1/1994 | Germany |
| 4300933 | 5/1994 | Germany |
| 4242978 | 6/1994 | Germany |
| 4325690 | 2/1995 | Germany |
| 1495396 | 12/1977 | United Kingdom |

OTHER PUBLICATIONS

Chem. Engineering, 85–293566/47, J6, "Waste gas denitration . . . waste gas", Oct. 14, 1985.
Chem. Engineering, 87–118712/17, J6, "Regenerating denitrification . . . washing with water", Mar. 18, 1987.
Chem. Engineering, 83–836431/49, J5, "Regenerating spent catalyst . . . waves", Oct. 31, 1983.
Chem. Engineering, 86–344175/52, J6, "Regeneration of ammonia . . . catalyst", Nov. 18,1986.
Chem. Engineering, 86–225397/34, J6, "Cleaning air by UV–irradiation . . . filter", Aug. 9, 1986.
Chem. Engineering, 86–308738/47, J6, "Regeneration of denitration catalyst . . . abrasion", Sep. 10, 1986.
Chem. Engineering, 47985Y/27, J5, "Activation of spent vanadium oxide . . . ammonia soln", May 26, 1977.
Chem. Engineering, 17179B/09, J5, "Regenerating vanadium–titania nitrogen . . . and calcining", Jan. 25, 1979.
Patent Abstracts of Japan, vol. 3, No. 055 Publ. No. 54032114, Publ. Date: Sep. 3, 1979; Sumitomo Chem. Co. Ltd.

*Primary Examiner*—Michael L. Lewis
*Assistant Examiner*—Alexander G. Ghyka

[57] ABSTRACT

The invention relates to a process for re-processing deactivated DENOX catalysts on the basis of Ti/V/Mo/W mixed oxides.

10 Claims, No Drawings

PROCESS FOR PRODUCING MIXED OXIDE POWDERS FROM DEACTIVATED DENOX CATALYSTS

The invention relates to a process for re-processing deactivated DENOX catalysts on the basis of Ti/V/Mo/W mixed oxides.

Catalysts used on an industrial scale for the removal of nitric oxides from waste gases, such as those from power stations or waste incineration plants, or from diesel engines, by selective catalytic reduction (SCR) with ammonia, for example, according to $$4\ NO + 4\ NH_3 + O_2 \rightarrow 4\ N_2 + 6\ H_2O$$

contain oxides of the elements V, Mo and W as catalytically active components on a support comprising titanium dioxide of the anatase modification. Components for improving mechanical strength, such as glass fibres and clays or other silicates are also used. These catalysts are known inter alia from DE-A 24 58 888.

In the course of their useful life the catalysts become contaminated by deposits of arsenic, thallium and alkali metal salts from the fly ash, as a result of which their activity declines. Due to their contents of the highly toxic elements As and Tl, which are up to 1000 ppm and can be even higher than this in exceptional cases, used catalysts have to be classified as special waste which can only be disposed of at great expense.

DE-A 40 13 720 has proposed incorporating the used DENOX catalyst into molten ash from the melting chamber furnace of a coal-fired power station, a melting chamber granular material thereby being formed from which the above-mentioned highly toxic components are only elutable to an insignificant degree, and which can be dumped.

Since it is, however, generally not desirable to dump the valuable substances Ti, Mo and W, and legislation also gives priority to recycling rather than dumping, the need exists for a process for re-processing deactivated DENOX catalysts while recovering the valuable substances and removing the catalyst poisons.

The conventional processes for reactivating used DENOX catalysts according to the prior art can be divided into four groups:

A) Mechanical Cleaning

From JP-61-259 764 it is known to clean catalysts by brushing with steel brushes. Abrasive treatment with sand or the like is proposed in EP-A 241 310 and with fly ash in JP-61-227 846. The deactivated sites in the pores are, however, not reached with these processes.

B) Heat Treatment, Including the Addition of Gases

DE-A 43 19 733 proposes removing arsenic and other sublimable contaminants by heat treatment. According to EP-A 303 560, catalysts can be regenerated with hot steam, wherein a portion of the arsenic migrates into the interior from the catalyst surface. According to JP-60-202 717 or JP-61-178 040, regeneration is achieved by contact with $SO_2$ and/or $SO_3$ gas. These methods do, however, have the disadvantage that in the case of heat treatment, a loss of activity through particle coarsening of the support and through possible rutilization is likely to occur. In the process according to DE-A 43 00 933, which provides for the heating of the catalyst initially in an $H_2$ atmosphere and then in an oxidizing gas, there is the additional problem of handling the highly inflammable hydrogen at elevated temperatures.

C) Leaching with Water, Acids, Bases or Other Regenerating Solutions

Known methods comprise treatment with water - including the use of ultrasound (JP-58-186 445, JP-62-61 647) -, with inorganic acids, particularly sulphuric acid, including the addition of $H_2O_2$ (JP-54-11 094, DE-A 38 16 600, EP-A 159 959), with oxalic acid (EP-A 161 206), with aqueous solutions of alkali metal hydroxides, alkaline earth metal hydroxides and alkali metal carbonates, followed by diluted acids (DE-A 38 24 464) and with aqueous $NH_3$ (JP-52-63 891). All these methods do, however, have the disadvantage that a definite separation between valuable and harmful substances is not achieved. After use, in addition to the separated catalyst poisons such as As and Tl, the regenerating fluids contain varying amounts of, for example, vanadium and tungsten, as a result of which the corresponding post-impregnation of the catalyst is required (EP-A 161 206, JP-54-10 294) and the regenerating fluid itself has to be re-processed at great expense (EP-A 499 351).

D) Recycling a) Sulphate process: after the used catalyst material has been digested with $H_2SO_4$ a titanyl sulphate solution results which additionally contains the components V, Mo, W, As and/or Tl. Arsenic is removed from this solution by extraction with a thiophosphoric acid derivative (DE-A 39 03 590) or by distillation, in the form of $AsCl_3$ (DE-A 42 42 978), and the mixed oxide is recovered by precipitation or hydrolysis. These separation processes are, however, complicated and no mention is made of what happens to the thallium.

b) Chloride process: According to DE-A-43 25 690 the used catalyst material is subjected to reductive chlorination, the $TiCl_4$ obtained is purified by distillation and reacted with oxygen to form $TiO_2$.

According to this process it is, however, not possible to obtain the anatase modification required for DENOX catalysts. Due to the small difference between their boiling points (136° and 131° C.), the separation of $TiCl_4$ and $AsCl_3$ by distillation is very difficult.

According to DE-A 24 58 888 a DENOX catalyst comprises, for example, an intimate mixture of the components:

A) titanium in the form of oxides
B) at least one metal from the group:
  B.1 iron and vanadium in the form of oxides and/or sulphates and/or from the group
  B.2 molybdenum, tungsten, nickel, cobalt, copper, chromium and uranium in the form of oxides
C) tin in the form of oxides
D) metals from the group beryllium, magnesium, zinc, boron, aluminium, yttrium, rare earth elements, silicon, niobium, antimony, bismuth and manganese in the form of oxides, wherein the components are present in the atomic ratios A to B to C to D=1 to (0.01 to 10) to (0 to 0.2) to (0 to 0.15).

The preferred elements are vanadium from the B 1 group and molybdenum and tungsten from the B 2 group.

In the course of their useful life the catalysts are poisoned in particular by deposits of arsenic, thallium and alkali metal salts from the fly ash, as a result of which their activity declines. Depending on the conditions of use of the catalysts, the content of toxic substances such as arsenic and thallium is usually up to 1000 ppm and in exceptional cases even more than 1000 ppm.

The object of the invention was therefore to provide a process for re-processing deactivated DENOX catalysts which ensures that the undesired constituents As and Tl are removed as quantitatively as possible from the valuable substances and which can be implemented economically and on an industrial scale.

This object has been achieved according to the invention by means of a recycling process in the context of the $TiO_2$ sulphate process.

The invention provides a process for producing mixed oxide powders from deactivated DENOX catalysts by recycling, characterized in that:

a) the deactivated DENOX catalyst is crushed, b) the crushed material from step a) is treated with an aqueous mineral acid to remove the thallium, c) the material from step b), from which thallium has been removed, is digested with sulphuric acid and/or oleum, d) the digested cake obtained in step c) is dissolved in water or dilute sulphuric acid and the undissolved constituents are separated off, e) arsenic is removed from the solution obtained in step d), f) the solution from step e) from which arsenic has been removed is hydrolysed and then filtered and the dilute sulphuric acid obtained is optionally re-processed, g) optionally after post-doping with compounds of one or more elements from the group W, Mo and V the hydrolysate obtained in step f) is dried and calcined to form the end product.

If required the used catalysts can be mechanically cleaned before step a), to remove ash and superficial deposits of catalyst poisons.

The deactivated DENOX catalyst is preferably ground to an average particle size of 1–50 $\mu$m.

The mineral acid used to remove the thallium from the ground deactivated DENOX catalyst is preferably hydrochloric acid. The concentration of the hydrochloric acid used is preferably between 10 and 20 wt. %. The treatment with hydrochloric acid preferably takes place at 60° to 100° C., particularly preferably at 70° to 90° C. The treatment time can preferably be 60 to 180 minutes, and the solids content of the suspension should preferably be below 30 wt. %, preferably between 15 and 25 wt. %.

According to the invention, more than 95% of the thallium is removed from the used catalyst by the treatment with hydrochloric acid. The valuable substances remain in the solid.

The economic efficiency of the treatment with mineral acid according to the invention is increased, since the mineral acid contaminated with Tl can be used to treat further used catalyst batches without interim re-processing. Surprisingly a notable decrease in the leaching capacity for the thallium only takes place after multiple use.

The mineral acid contaminated with thallium is preferably re-processed. The thallium is preferably precipitated, for example in the form of an iodide, or obtained in the form of a solid chloride by evaporation of the hydrochloric acid solution. The thallium concentrate can be processed further or dumped.

After thallium extraction, the catalyst material is preferably washed free of chloride with sulphuric acid.

In a further embodiment the hydrochloric acid containing TlCl can be displaced using pure hydrochloric acid.

As is known from the prior art, the digestion in step c) is carried out batchwise or continuously with sulphuric acid and/or oleum at temperatures of 100° to 330° C., preferably 150° to 300° C.

The weight ratio of sulphuric acid to titanium dioxide is preferably 1.0 to 6.0, particularly preferably 1.5 to 3.0. Fresh acids and re-processed acids can be used as digestion acids. The concentration of the acids is at least 20 wt. % of $H_2SO_4$. Acid concentrations between 65 and 96 wt. % of $H_2SO_4$ are most suitable. Thorough mixing and high heat transfer should be maintained from the start.

In a special embodiment of the process according to the invention, the digested material can then be subjected to a heat treatment. The duration of the heat treatment is preferably 0.5 to 5 hours and the temperature is at most 350° C., preferably 150° to 250° C.

As is generally known, the digested material is dissolved in water or dilute sulphuric acid. Dissolution can take place in a single or multi-stage process. A continuous co-current or counter-current method of procedure is particularly efficient.

The removal of the undissolved constituents is carried out in known manner, e.g. by sedimentation and/or filtration, optionally with the addition of filtration auxiliaries. The residues can be washed and passed on for processing or dumping.

The solutions which are obtained when the residue is washed and which contain small quantities of sulphuric acid and titanyl sulphate can be returned to the dissolution step d).

The solution from which the undissolved constituents have been removed still contains arsenic. The arsenic can be removed either by extraction, distillation or sulphide precipitation.

The precipitation of the arsenic sulphide can preferably be carried out using hydrogen sulphide, diphosphorus pentasulphide or iron sulphide. Particularly preferably, arsenic is precipitated using $P_2S_5$, the solution being preferably heated to 50° to 70° C. and the precipitating agent being added in an up to 10-fold excess compared with the stoichiometric quantity. After the addition of the precipitating agent the mixture is preferably stirred for a further 1 to 3 hours at the reaction temperature.

The precipitation using $H_2S$ or iron sulphide is preferably carried out at elevated pressure.

Surprisingly, more than 99% of the arsenic is precipitated in the form of a sulphide which can easily be filtered.

The sulphuric acid solution from which Tl and As have been removed is then hydrolysed, as is known from the prior art, wherein the titanium is precipitated together with the remaining valuable substances in the form of hydrated oxides. The hydrolysis can be carried out either thermally, optionally in the presence of nuclei, or by neutralization.

For the quantitative precipitation of the valuable substances in the thermal hydrolysis, the titanyl sulphate solution is preferably adjusted to 200 to 280 g/l of $TiO_2$ and to a weight ratio of sulphuric acid to titanium dioxide of between 1.5 and 3.0. It is particularly efficient to already set these values in the digestion stage.

The hydrated oxides are separated from the sulphuric acid in known manner and processed further.

In addition to $TiO_2$ hydrate the As and Tl-free hydrolysate contains 5 to 10 wt. % of sulphate (based on $TiO_2$) and molybdenum/tungsten oxide in the weight ratio to $TiO_2$ specified by the composition of the solution to be hydrolyzed, usually approx. 5 to 10 wt. %. Apart from the $MoO_3/WO_3$ content the hydrolysate thus corresponds to the purified hydrolysates of the sulphate process, as described in Ullmann's Encyclopaedia of Industrial Chemistry, 5th ed., Vol.A 20, p. 278–279.

The sulphate content of the hydrolysate can be reduced before further processing to form a mixed oxide powder suitable for producing DENOX catalysts.

This can be carried out according to EP-A 390 059 by adding an aqueous ammonia or ammonium carbonate solution until the mixture is slightly alkaline, whereby a portion of the sulphate is desorbed and converted into ammonium sulphate. The ammonium sulphate is removed by sublimation in the subsequent calcination.

In a further preferred embodiment which is particularly advantageous from an ecological point of view, the sulphate content can be reduced according to DE-A 43 21 555 by increasing the pH value of the $TiO_2$ hydrate suspension containing sulphuric acid and $MoO_3/WO_3$, with an aqueous alkali metal hydroxide or carbonate solution, filtration and careful washing of the precipitate to separate the alkali metal sulphate.

Intensive washing is preferably carried out to remove the alkali metal ions, which are known to be catalyst poisons (J P Chen and R T Yang, J. Cat. 125, 411–420 (1990); ibid., Appl. Cat. A 80, 135–148 (1992)).

Surprisingly, it has been found that when the pH is adjusted only sulphate is desorbed and converted into an alkali metal salt which can be washed out, while the molybdenum/tungsten oxide precipitated together with the $TiO_2$ is not desorbed. On filtration and washing, therefore, only the undesired components sulphate and alkali ions are removed, without there being any losses as of the valuable substances.

Before calcination, the optionally sulphate-depleted intermediate product can be post-doped.

In this case further components, e.g. compounds of catalytically active elements, are added to the intermediate product.

Examples of such compounds are the ammonium salts of mono and isopolyoxy anions of the elements W, Mo and V in their highest oxidation stages, e.g. ammonium paratungstate, ammonium heptamolybdate and ammonium monovanadate.

The material obtained in this way is dried and calcined according to the prior art. The end product obtained is an arsenic- and thallium-free mixed oxide powder suitable for producing DENOX catalysts.

The dilute sulphuric acid obtained on hydrolysis, which contains small quantities of vanadium sulphate as the main contaminant, is preferably re-processed. This can take place, for example, by neutralization with lime to form gypsum. Alternatively the sulphuric acid can be concentrated and re-used, e.g. for the digestion of deactivated DENOX catalysts or titanium ores, optionally with the addition of fresh acids and/or oleum.

The concentration is advantageously carried out together with dilute acid containing iron sulphate from the $TiO_2$ sulphate process, e.g. corresponding to EP-A 133 505. In this case the vanadium sulphate is separated from approx. 65 wt. % sulphuric acid together with the other metal sulphates.

If no re-processing plant for dilute acid from a $TiO_2$ pigment production process is available, the dilute acid obtained when the used catalyst is re-processed can be concentrated in a manner that is known in principle.

The process according to the invention will be explained in greater detail with the aid of the example which follows, without this representing any limitation.

EXAMPLE

Tl Separation

One part by weight of a deactivated DENOX catalyst which had been ground to an average particle size of 5.2 μm and comprised 80.0 wt. % of $TiO_2$, 8.8 wt. % of $WO_3$, 315 ppm of As, 270 ppm of Tl was stirred with four parts by weight of a 15 wt. % hydrochloric acid for 2 hours at 80° C. After the suspension had cooled to 60° C. the eluate containing Tl was filtered off and the filter cake washed free of chloride with water.

The eluate containing Tl was similarly used for the leaching of a further nine batches of the deactivated DENOX catalyst. On average the combined filter cakes contained less than 8 ppm of thallium.

After the multiple leaching the hydrochloric acid solution was concentrated in a rotary evaporator to a thallium concentration of 4.5 g/l, the thallium being obtained in the form of a solid chloride.

Digestion

The filter cake with an average particle size of 5.2 μm which had been washed free of chloride and freed from thallium was adjusted to an acid number of 2.0 (weight ratio of sulphuric acid (100%): titanium dioxide) and an acid concentration of 86 wt. % by the addition of concentrated sulphuric acid and oleum and continuously digested in an indirectly heated digester at 250° C. with a throughput of 6.6 kg of suspension/hour. The yield of $TiO_2$ and/or $WO_3$ (based on the $TiO_2$ and/or $WO_3$ in the feed material) was 99.5% and >99% respectively.

Dissolution/filtration

The digested cake was dissolved within six hours by the addition of water and adjusted to a concentration of 260 g of $TiO_2$/l. The sulphuric acid solution obtained in this way was freed from non-digested constituents via a filter press.

Arsenic Precipitation/separation 1 kg of this tungsten-containing titanyl sulphate solution with an arsenic content of 100 mg/l was mixed with 1.3 g of diphosphorus pentasulphide and stirred for two hours at 60° C. The precipitated arsenic sulphide was then separated by filtration. The filtered solution then contained less than 1 mg/l of arsenic.

Hydrolysis/filtration

The solution obtained in this way was then hydrolysed. For this purpose 1 kg of titanyl sulphate solution, which contained 260 g of $TiO_2$/l and 32.4 g of $WO_3$/l in dissolved form and in which the weight ratio of sulphuric acid to titanium dioxide was 2.0, was stirred for 45 minutes at boiling point and then for a further 250 minutes at 105° C. During heating, when a temperature of 90° C. was reached, 27 ml of a sol containing titanium dioxide nuclei was added.

To produce the nuclei-containing sol, 175 ml of the above-mentioned solution with a content of 260 g of $TiO_2$/l was heated to 90° C. and added to 100 ml of a 7.5 wt. % sodium hydroxide solution of a temperature of 60° C. within three minutes. After clarification the nuclei-containing sol was ready for use.

Seventy minutes after the temperature had dropped to 105° C. the $TiO_2$ content was reduced to 160 g $TiO_2$/l by dilution with 2116 ml of water, the hydrolysis temperature remaining unchanged. The water was metered in continuously within 120 minutes. The precipitated hydrated oxides were filtered off and washed with water. The yield of $TiO_2$ and $WO_3$ was higher than 98%, based on the titanyl sulphate solution used. The resulting dilute sulphuric acid was concentrated to 65 wt. % $H_2SO_4$ by evaporation, so that re-use for digestion was possible in combination with concentrated sulphuric acid or oleum.

pH Adjustment/sulphate Separation/drying

The washed hydrolysate was mixed with water to form a 20 wt. % suspension.

3750 g of the suspension, corresponding to 750 g of $TiO_2+WO_3$, with a pH of 1.2 was heated to 60° C. and adjusted to a pH of 5.2 with 50.6 wt. % aqueous sodium hydroxide solution with stirring. 84.6 g of the sodium hydroxide solution were used for this. The hydrated oxides were filtered using polyester filter cloths, washed with water of a temperature of 80° C. and then dried at a maximum of 130°. The $WO_3$ contents of the load and wash filtrates were below the detection limit of 0.01 mg/l.

Calcination 60 g of this intermediate product were calcined for an hour in a quartz flask while rotating at 580° C. 56.4 g of a mixed oxide powder which had the following analytical data and was suitable for producing DENOX catalysts were obtained:

| | |
|---|---|
| $TiO_2$ | 87.6 wt. % |
| $WO_3$ | 10.4 wt. % |
| $SO_4^{2-}$ | 1.7 wt. % |
| $Na_2O$ | 85 ppm |
| As | 4 ppm |
| Tl | 4 ppm |
| Specific surface area* | 95 $m^2/g$. |

*determined according to the BET one-point method, carrier gas $He/N_2$ (90/10 vol. %), 1 hour's heating at 140° C.

Comparative Example

Starting from the same deactivated DENOX catalyst, a mixed oxide powder produced according to the same process but solely without the thallium separation and arsenic separation partial steps, had the following analytical composition:

| | |
|---|---|
| $TiO_2$ | 86.2 wt. % |
| $WO_3$ | 10.8 wt. % |
| $SO_4^{2-}$ | 1.95 wt. % |
| $Na_2O$ | 45 ppm |
| As | 248 ppm |
| Tl | 200 ppm |
| Specific surface area* | 84.2 $m^2/g$. |

The examples show that the content of arsenic and thallium in the catalyst primary product can be reduced from 248 ppm to 4 ppm of arsenic (i.e. by 98.6%) and from 200 ppm to 4 ppm of thallium (i.e. by 98%) by the process according to the invention. It is thus possible to completely re-process and re-use deactivated DENOX catalysts.

We claim:

1. A process for producing mixed oxide powders from deactivated DENOX catalysts comprising thallium by recycling, wherein:

a) the deactivating DENOX catalyst is crushed;

b) the crushed material from step a) is treated with an aqueous mineral acid to remove the thallium, c) the material from step b) from which thallium has been removed is digested with sulphuric acid and/or oleum;

d) the digested cake obtained in step c) is dissolved in water or dilute sulphuric acid and the undissolved constituents are separated off;

e) arsenic is removed from the solution obtained in step d);

f) the solution from which arsenic has been removed is hydrolysed and then filtered, and the dilute sulphuric acid obtained is optionally re-processed;

g) the hydrolysate obtained in step f) is dried and calcined, optionally after post-doping with compounds of one or more elements from the group W, Mo and V, to form a product.

2. The process according to claim 1, wherein the deactivated DENOX catalyst is ground to an average particle size of 1–50 μm in step a).

3. A process according to claim 1, wherein hydrochloric acid is used as the mineral acid in step b).

4. A process according to claim 3, wherein the concentration of the hydrochloric acid is between 10 and 20 wt. %.

5. A process according to claim 1, wherein arsenic is removed by extraction.

6. A process according to claim 1, wherein arsenic is removed by distillation.

7. A process according to claim 1, wherein arsenic is removed by sulphide precipitation.

8. A process according to claim 7, wherein the sulphide precipitation of the arsenic is carried out in the presence of diphosphorus pentasulphide.

9. A mixed oxide powder comprising the product produced by the process of claim 1.

10. A DENOX catalyst prepared from the mixed oxide powder as claimed in claim 9.

* * * * *